US008599264B2

(12) United States Patent
Schmidt

(10) Patent No.: US 8,599,264 B2
(45) Date of Patent: Dec. 3, 2013

(54) COMPARISON OF INFRARED IMAGES

(75) Inventor: Roger Schmidt, Shorewood, MN (US)

(73) Assignee: Fluke Corporation, Everett, WA (US)

( * ) Notice: Subject to any disclaimer, the term of this patent is extended or adjusted under 35 U.S.C. 154(b) by 411 days.

(21) Appl. No.: 12/948,286

(22) Filed: Nov. 17, 2010

(65) Prior Publication Data

US 2011/0122251 A1    May 26, 2011

Related U.S. Application Data

(60) Provisional application No. 61/263,027, filed on Nov. 20, 2009.

(51) Int. Cl.
*H04N 5/33* (2006.01)
(52) U.S. Cl.
USPC ........... 348/164; 348/165; 348/166; 348/167; 348/168; 348/169; 348/162; 348/33; 348/34
(58) Field of Classification Search
USPC ......................................... 348/164, 165–169
See application file for complete search history.

(56) References Cited

U.S. PATENT DOCUMENTS

| 4,249,797 | A | * | 2/1981 | Sendecki | 359/629 |
|---|---|---|---|---|---|
| 5,081,693 | A | * | 1/1992 | Gannon | 382/312 |
| 5,144,145 | A | * | 9/1992 | Jutamulia et al. | 250/484.4 |
| 5,574,511 | A | * | 11/1996 | Yang et al. | 348/586 |
| 5,900,942 | A | * | 5/1999 | Spiering | 356/400 |
| 5,910,816 | A | * | 6/1999 | Fontenot et al. | 348/65 |
| 5,923,380 | A | | 7/1999 | Yang et al. | |
| 6,444,983 | B1 | | 9/2002 | McManus et al. | |
| 6,515,285 | B1 | * | 2/2003 | Marshall et al. | 250/352 |
| 6,606,115 | B1 | * | 8/2003 | Alicandro et al. | 348/164 |
| 6,640,130 | B1 | | 10/2003 | Freeman et al. | |
| 6,989,745 | B1 | * | 1/2006 | Milinusic et al. | 340/541 |
| 7,535,002 | B2 | * | 5/2009 | Johnson et al. | 250/332 |
| 7,544,944 | B2 | * | 6/2009 | Strandemar et al. | 250/339.05 |
| 2005/0270784 | A1 | * | 12/2005 | Hahn et al. | 362/459 |
| 2006/0249679 | A1 | * | 11/2006 | Johnson et al. | 250/332 |
| 2007/0247517 | A1 | * | 10/2007 | Zhang et al. | 348/30 |
| 2008/0099678 | A1 | * | 5/2008 | Johnson et al. | 250/332 |
| 2009/0002475 | A1 | * | 1/2009 | Jelley et al. | 348/14.01 |
| 2009/0302219 | A1 | * | 12/2009 | Johnson et al. | 250/332 |
| 2010/0014746 | A1 | | 1/2010 | Warnke et al. | |
| 2010/0045809 | A1 | | 2/2010 | Packard | |

(Continued)

OTHER PUBLICATIONS

Kirk, Johnson et al.: "Commercial Fusion Camera," Proceedings of SPIE, SPIE, USA, vol. 6205, Apr. 17, 2006 XP002537757, ISSN: 0277-786X, pp. 62050H-1 to 62050H-9.

(Continued)

*Primary Examiner* — Andy Rao
*Assistant Examiner* — Shan Elahi
(74) *Attorney, Agent, or Firm* — Fredrikson & Byron, PA

(57) ABSTRACT

Methods for comparing infrared image data and/or for generating infrared image comparison data are provided. In one method two image data sets are selected including visual-light and infrared image data from one or more points of view of a scene. Visual-light image data from each data set can be compared to determine an alignment correlation between different points of view for the visual-light data. The alignment correlation can then be used to correlate infrared image data from each data set. The correlated infrared image data can be compared to generate infrared comparison image data. Thermal imaging cameras capable of performing such methods are also provided.

18 Claims, 7 Drawing Sheets

(56) References Cited

U.S. PATENT DOCUMENTS

| | | | |
|---|---|---|---|
| 2010/0127171 A1* | 5/2010 | Jonsson et al. | 250/330 |
| 2010/0265332 A1* | 10/2010 | George-Svahn et al. | 348/164 |
| 2010/0270469 A1 | 10/2010 | Johnson et al. | |
| 2011/0169911 A1* | 7/2011 | Gabura | 348/32 |
| 2012/0182427 A1* | 7/2012 | Marshall | 348/159 |

OTHER PUBLICATIONS

ENVI User's Guide: "Automatically Coregister Images," Map Tools (Aug. 12, 2005), XPO02628910, Retrieved from Internet: URL:http://geol.hu/data/online_help/Automatically_Coregister_Images.html, Retrieved on Mar. 18, 2011, pp. 1-3.

Search Report and Opinion for European Application No. 10192090.8, dated Apr. 4, 2011, 7 pages.

The MathWorks, Inc., Image Processing Toolbox 6, Sep. 2007, MATLAB 9414v06, 4 pages.

Infrared Solutions, Inc., SnapView Pro™ Imaging Software, Under Manual, Jan. 2000, Version 2.3, 64 pages.

\* cited by examiner

COMPARISON OF INFRARED IMAGES

CROSS-REFERENCE TO RELATED APPLICATIONS

This application claims priority from U.S. Provisional Application Ser. No. 61/263,027, filed Nov. 20, 2009, and titled "Comparison of Infrared Images," the contents of which are hereby incorporated by reference in their entirety.

BACKGROUND

Thermal or infrared imaging cameras are well known and have long been used in many settings to measure and/or compare the temperatures of multiple objects or the temperature profiles of a single object over a period of time. Among other uses, these instruments are frequently used in industrial applications as part of preventative maintenance programs. These types of programs typically rely on periodic inspections of the assets of a plant or facility to discover likely failures before they occur. For example, plant personnel often develop survey routes in order to routinely gather temperature data on the identified equipment.

After collecting a thermal baseline image for each piece of equipment along a route, a technician can then identify changes in thermal characteristics over the course of several inspections by comparing later thermal images of the equipment with the baseline image or other prior images. Changes in thermal characteristics can in some cases indicate the imminent failure of a part, thus allowing the technician to schedule maintenance or replacement prior to failure.

In a simple case, a technician can visually compare two or more thermal or infrared images to determine changes in thermal characteristics occurring over a period of time. Visual comparison of two infrared images can at times be difficult because most infrared images are by their very nature less sharp compared to visible images which are a result of reflected visible-light. For example, considering an electric control panel of an industrial machine which has many electrical components and interconnections, the visible image will be sharp and clear due to the different colors and well defined shapes. The infrared image will appear less sharp due to the transfer of heat from the hot part or parts to adjacent parts. Also, coloring, lettering and numbering clearly shown in the visible image will not appear in the infrared image.

Infrared images often have a low resolution when compared with visual images and may be especially difficult to interpret and compare when part of the scene and image exhibit a low infrared image contrast. Accordingly, it may be difficult to correlate features and objects within two infrared images because object and feature boundaries can be difficult to discern in low resolution. In addition, the thermal image profile may have changed between image captures such that features present in one infrared image are now invisible (i.e., the same temperature as the scene background) in a second infrared image of the same scene. Thus, while a change in temperature may be suspected, it can be difficult to determine which objects or parts of objects within the scene exhibit the thermal change, in part because it is difficult to discern which objects in the first image correspond with objects in the second infrared image.

To aid a visual comparison of infrared images, some infrared imaging cameras allow the operator to capture a visible-light image (often called a "control image") of the scene using a separate visible-light camera built into the thermal imaging camera. Some of these thermal imaging cameras allow a user to view the visible-light image side-by-side with the infrared image. Some thermal imaging cameras may also provide simultaneous viewing of the infrared image and the visible-light image overlapping each other and blended together. For example, Fluke Corporation's FlexCam® series of cameras incorporates a software feature called IR-Fusion®, which allows a user to blend the infrared and visible-light images together at any ratio from 100% visible to 100% infrared. Such features provide the operator with a visible-light image reference for each infrared image, thus making visual comparison of the infrared images somewhat easier.

Image processing software may also be used to compare two or more infrared images, and can, in many instances provide a much more informative and quantitative comparison of two infrared images than a mere visual inspection. For example, image processing software may subtract a later infrared image from an earlier infrared image of the same scene to determine whether changes in the thermal characteristics of the scene have occurred.

A further complexity for image comparison can result from unaligned or misaligned infrared images. In some cases, a fixed or stationary infrared imaging camera may be used to capture highly registered successive thermal images of a scene. Often, though, multiple infrared images are captured using a handheld thermal imaging camera. Accordingly, images of the same scene captured at different times may show different views of the same scene. For example, successive infrared images may have slightly different perspectives of the scene, may be captured with different zoom factors, and/or may be translated (e.g., horizontally and/or vertically) with respect to each other. These types of misalignments between infrared images can make thermal images difficult to compare to one another, both visually and through software comparisons in which computed comparison data is not very useful.

SUMMARY

According to one aspect of the invention, a method for comparing infrared (IR) image data representative of a scene is provided. The method includes selecting first and second image data sets of a scene. The first data set includes first visual-light (VL) image data captured from a first VL point of view and first IR image data captured from a first IR point of view. The second data set includes second VL image data captured from a second VL point of view and second IR image data captured from a second IR point of view. In some cases the first VL point of view has a first known correlation to the first IR point of view and/or the second VL point of view has a second known correlation to the second IR point of view. The method further includes comparing the first and second VL image data to determine an alignment correlation between the first and the second VL points of view. The second IR image data can then be correlated with the first IR image data using the alignment correlation from the VL image data. In some cases the IR image data may also be correlated using the first and/or the second known correlations. The method also includes comparing at least a portion of the first IR image data to a correlated portion of the second IR image data to generate IR comparison image data. In some embodiments comparing the portion of the first IR image data with the correlated portion of the second IR image data comprises subtracting the correlated portion of the second IR image data from the portion of the first IR image data.

According to another aspect of the invention, a computer-readable storage medium having computer-executable instructions for performing the foregoing method is provided.

According to another aspect of the invention, an IR imaging camera is provided. The IR or thermal imaging camera includes, among other things, a VL camera module having a VL sensor for capturing VL image data from a scene and an IR camera module having an IR sensor for capturing IR image data from the scene. The IR camera module can have a known spatial correlation to the VL camera module. The camera can also include a display for displaying at least a portion of the VL image data and/or at least a portion of the IR image data.

According to a preferred embodiment, the camera also includes a programmable processor coupled with the display and the IR and the VL camera modules. The processor is programmed with instructions for (a) selecting a first image data set of the scene, the first image data set comprising first VL image data captured by the VL camera module from a first VL point of view and first IR image data captured by the IR camera module from a first IR point of view, the first VL and the first IR points of view related by the known spatial correlation, (b) selecting a second image data set of the scene, the second image data set comprising second VL image data captured by the VL camera module from a second VL point of view and second IR image data captured by the IR camera module from a second IR point of view, the second VL and the second IR points of view related by the known spatial correlation, and (c) generating IR comparison image data from the first and the second IR image data, comprising (1) comparing the first VL image data to the second VL image data to determine an alignment correlation between the first VL point of view and the second VL point of view, (2) correlating the second IR image data with the first IR image data using the known spatial correlation and the alignment correlation, and (3) comparing at least a portion of the first IR image data to a correlated portion of the second IR image data to generate the IR comparison image data.

According to another aspect of the invention, a method of tracking localized temperature changes within a scene is provided. The method includes capturing at a first instant first VL image data of a scene and first IR image data of the scene. The first IR image data is indicative of localized temperatures within the scene at the first instant. The method also includes capturing at a second instant second VL image data of the scene and second IR image data of the scene, where the second IR image data is indicative of the localized temperatures within the scene at the second instant. An alignment correlation is determined between the first and the second VL image data, and then used to correlate the second IR image data with the first IR image data. The method also can include comparing at least a portion of the first IR image data to a correlated portion of the second IR image data. This may generate IR comparison image data indicative of differences between the localized temperatures within the scene at the first instant and the second instant. Finally, in some embodiments, at least a portion of the IR comparison image data may be displayed.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF ILLUSTRATIVE EMBODIMENTS

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

Embodiments of the present invention are useful for comparing infrared (i.e., thermal) image data (i.e., corresponding to images of a scene) captured by a thermal imaging camera in order to, for example, determine temperature differences in the infrared image data. For example, some embodiments allow for determining temperature changes occurring in a scene over a period of time. Such a determination can be useful in many situations and applications. As just one example, some embodiments of the invention can be implemented in the field of preventative maintenance, to determine and localize changes in the thermal characteristics of equipment over time.

Figure 1:
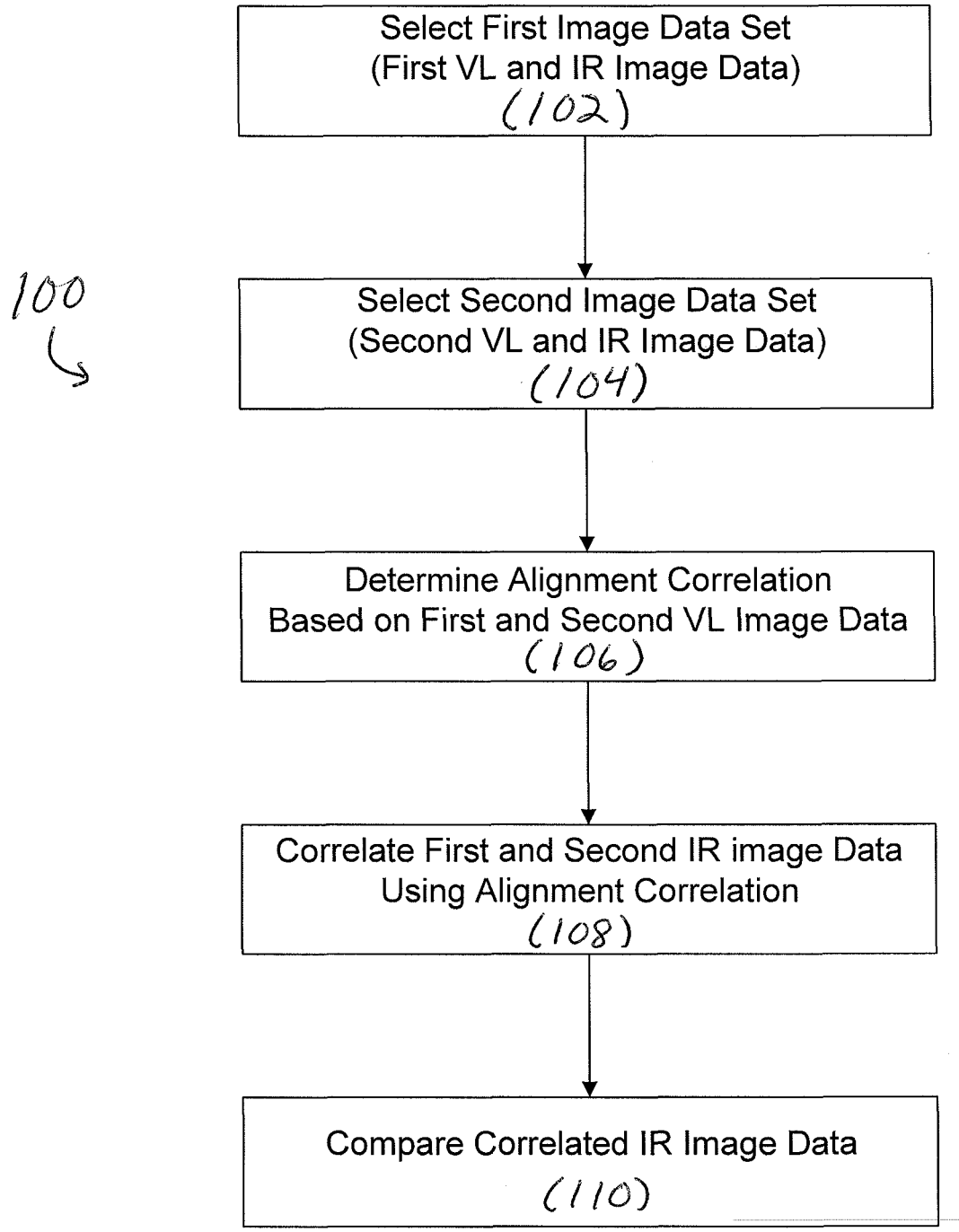
FIG. 1 is a flow diagram illustrating a method of comparing infrared image data according to an embodiment of the invention.

Turning to FIG. 1, a flow diagram is shown illustrating a method 100 of comparing infrared image data according to an embodiment of the invention. The method 100 includes selecting a first image data set 102 and selecting a second image data set 104 for comparison. For example, the first image data set may include image data representative of one or more images of a scene, while the second image data set may include image data representative of one or more different images of substantially the same scene.

In some embodiments, the first image data set includes first visual light (VL) image data and first infrared (IR) image data for a scene. In some cases the first VL image data is representative of a first VL image of the scene while the first IR image data is representative of a first IR image of the same scene. The first VL and IR image data may be collected or captured at the same time (e.g., a first instant) such that the image data is representative of VL and IR images of the scene captured substantially simultaneously, with the IR image data being indicative of localized temperatures within the scene at the first instant. Of course, the first VL and the first IR image data does not need to be collected simultaneously in some embodiments.

Similarly, the second image data set includes second VL image data and second IR image data representative of substantially the same scene as the first VL and the first IR image data. In some cases the second VL image data is representative of a second VL image of the scene while the second IR image data is representative of a second IR image of the same scene. The second VL and IR image data can be collected at the same time (e.g., a second instant) such that the image data is representative of VL and IR images of the scene captured substantially simultaneously, with the second IR image data being indicative of localized temperatures within the scene at the second instant. In some embodiments the second VL and IR image data is preferably captured at an earlier or later time than the capture of the first VL and IR image data. Such timing can allow comparisons of the image data over time that are indicative of differences between the localized temperatures within the scene at the first and the second instants.

In some embodiments the VL and IR image data in the first and second image data sets are captured from one or more different points of view of the scene. Thus, while the image data (and corresponding images) may be representative of substantially the same scene, some of the image data may reflect views of the scene from slightly different perspectives (e.g., the data is vertically, horizontally, and/or rotationally translated with respect to the scene). In some embodiments the first VL image data may be captured from a first VL point of view that is different than a first IR point of view used to capture the first IR image data. For example, a parallax error may be introduced between the first VL and IR points of view due to, e.g., a spatial separation between VL and IR cameras used to capture the image data.

Similarly, the second VL image data may be captured from a second VL point of view different from a second IR point of view used to capture the second IR image data. In addition, in some embodiments, the first and the second VL points of view may be different and/or the first and the second IR points of view may be different from each other. As previously discussed, capturing IR image data from differing points of view can make it difficult to accurately compare the IR image data. For example, if the first IR image data is spatially translated with respect to the second IR image data, directly comparing the IR image data pixel-for-pixel will in reality compare different points of the scene leading to inaccurate comparisons.

Returning to FIG. 1, in some embodiments of the invention, the method of comparing IR image data includes comparing the first VL image data with the second VL image data to determine an alignment correlation based on the VL image data 106 (e.g., based on the difference between the first VL point of view and the second VL point of view). For example, one or more image processing algorithms can be used to determine which pixels of scene data in the first and the second VL image data correspond to each other. In some cases the alignment correlation can then be used to account for differences between the first and the second IR points of view, thus allowing correlation of the first IR image data and the second IR image data 108 for more accurate comparison.

Accordingly, in some cases a misalignment of the first and the second IR image data (and corresponding images) can be addressed without necessarily determining a direct alignment relationship or spatial correlation between the first and the second IR image data and images. It can sometimes be difficult to directly characterize a misalignment between IR images and image data because, for example, the IR image data may have a limited resolution, heat often appears across visual boundaries, and/or the IR image data may have a low infrared image contrast. Correlating the first and the second IR image data (e.g., resulting in aligned or registered corresponding IR images) based on the alignment correlation of the first and the second VL image data advantageously avoids the limitations of these types of effects.

In addition to the alignment correlation between the first and the second VL points of view, some embodiments utilize additional data correlations to more accurately correlate the first IR image data with the second IR image data. In some cases, the first VL point of view is related to the first IR point of view by a first known correlation. For example, the first VL and IR image data can be captured by a dual-lens thermal imaging camera and the first known correlation may be a parallax error between the positions of the VL lens and the IR lens in the camera. In some embodiments the first known correlation (e.g., parallax error) may be fixed. A second known correlation between the second VL and the second IR points of view may also be used to more accurately correlate the IR image data. In some cases the method of comparing IR image data includes correlating the first and the second IR image data using the first and the second known correlations along with the alignment correlation. In some embodiments the first known correlation between the first VL and IR points of view is the same as the second known correlation between the second VL and IR points of view. For example, the same thermal imaging camera may be used to capture both the first and the second sets of image data.

After correlating the first and the second IR image data, at least a portion of the first IR image data can be compared to a correlated portion of the second IR image data 110. Because the IR image data is correlated, specific scene pixels in the first IR image data can be matched to the same scene pixels in the second IR image data, allowing a pixel-for-pixel comparison of the actual scene data. The comparison can identify differences in the scene occurring over a period of time between the times the first and second IR image data was captured. As previously discussed, identification of scene temperature changes can be helpful in a wide variety of applications, including for example, the field of preventative maintenance.

In some embodiments, comparing the IR image data can generate IR comparison image data indicative of differences between the first and the second IR image data. For example, the IR comparison image data may be correlated with temperature differences within the scene. In some instances the comparison comprises subtracting the correlated portion of the second IR image data from the at least a portion of the first IR image data. In this case the IR comparison image data comprises the difference between the first and the second IR image data.

In some embodiments the IR comparison image data can be displayed in a variety of ways to allow an operator to view and analyze the data. For example, the IR comparison image data may be displayed in combination with one of the first VL image data or the second VL image data to produce a VL and IR comparison image. The IR comparison image data may also be combined with VL image data to generate a VL and IR composite comparison image.

In preferred embodiments, the IR comparison image data is correlated with temperature differences between the first and the second IR image data. In some cases the correlated temperature differences are used to threshold the IR comparison image data. Thresholding allows the identification of a subset of the IR comparison image data that exceeds a predetermined threshold temperature difference. The IR comparison image data can thus be screened to ensure the most prominent temperature differences are identifiable.

According to some embodiments of the invention, the VL and the IR images of the first and the second image data sets can be generated by any known infrared and visible light imaging devices. Often the VL and the IR image data is captured by an infrared imaging camera also having visible-light imaging capabilities. One example of such an infrared imaging camera is illustrated in perspective in FIGS. 2A and 2B. A block diagram of the infrared imaging camera according to some embodiments is also shown in FIG. 3.

Figure 2A:
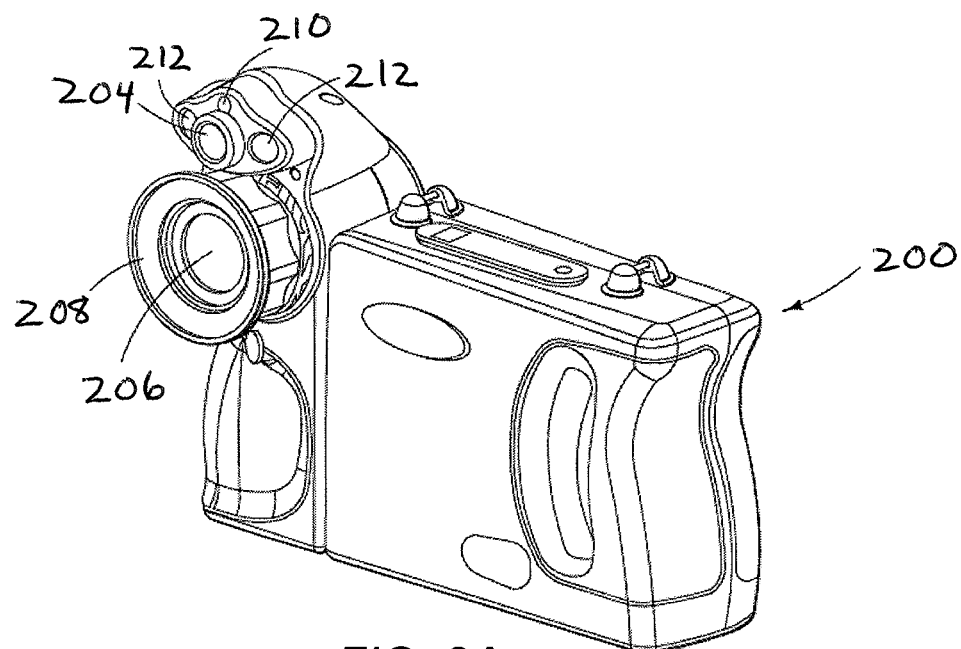
FIGS. 2A and 2B are perspective views of an infrared imaging camera according to an embodiment of the invention.
Figure 2B:
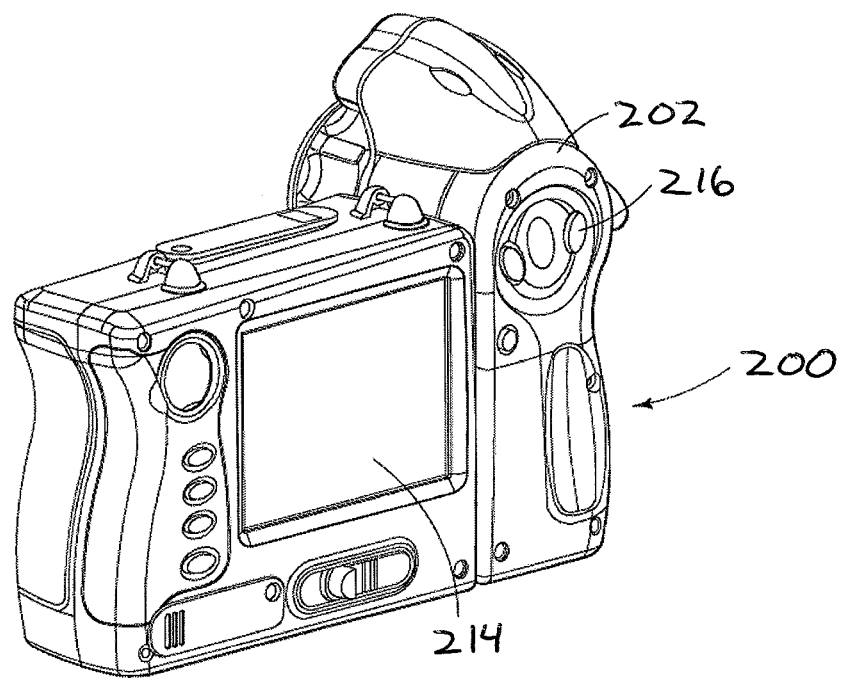

FIGS. 2A and 2B are perspective views, respectively, of the front and the back of a infrared imaging camera 200 according to certain embodiments of the invention. The infrared camera 200 includes an infrared camera module and a visible-light camera module. In particular, the camera 200 includes a camera housing 202, a visible-light lens 204, an infrared lens 206, a focus ring 208 and a laser pointer 210, as well as various electronics located within the housing as will be described with reference to FIG. 3. As shown in FIG. 2A, in some cases the VL lens 204 and the IR lens 206 may be offset from one another, thus providing a known, fixed spatial correlation between VL and the IR image data and images captured by the camera 200. For example, in some cases the VL lens 204 and the IR lens 206 maybe placed such that the visible and infrared optical axes are as close as practical and roughly parallel to each other. Referring to FIG. 2A, for example, the VL lens 204 and the IR lens 206 may be co-located in the vertical plane of the IR optical axis. Of course other spatial arrangements are possible, such as, for example, co-location within a horizontal plane.

In one embodiment, an LED torch/flash 212 is located on each side of the visible-light lens 204 to aid in providing enough light in dark environments. A display 214 is located on the back of the camera so that IR images, VL images and/or blended images generated from the VL and the IR image data may be viewed. In addition, target site temperature (including temperature measurement spot size) and distance readings may be displayed. Also located on the back of the camera are user controls 216 to control the display mode and activate or deactivate the laser pointer.

Figure 3:
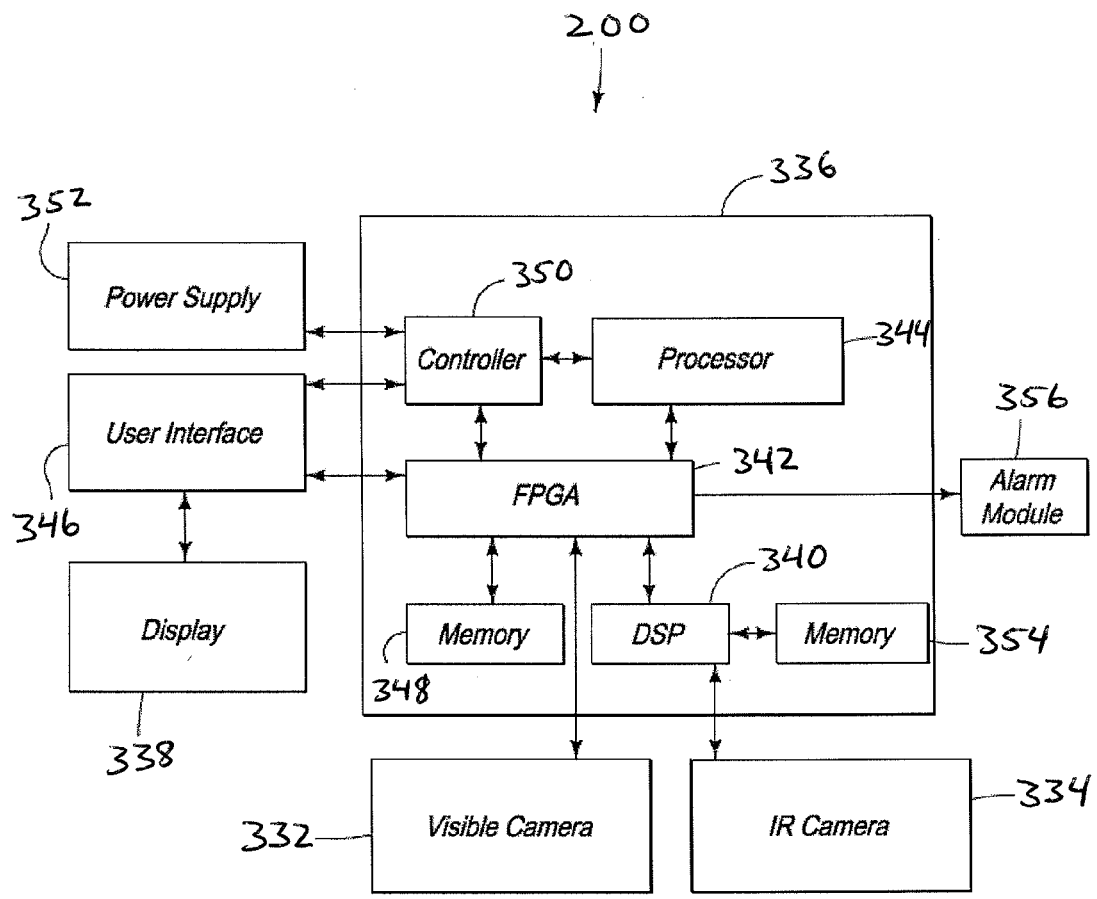
FIG. 3 is a block diagram of an infrared imaging camera according to an embodiment of the invention.

FIG. 3 is a block diagram showing the internal electronics of the infrared imaging camera 200 according to one embodiment of the invention. The camera 200 generally includes a visible-light camera module 332, an infrared camera module 334, and a processing sub-system 336 that receives and processes image data from the camera modules and outputs corresponding image data to a display 338. The visible-light camera module 332 in some embodiments may include a CMOS, CCD or other type of visible-light camera system. It may also include accessories such as an LED torch/flash and/or a laser pointer. The visible-light camera module 332 includes a visible-light sensor that captures a VL image of a scene and generates and streams corresponding VL image data (e.g., RGB, 10 Hz) to the processing sub-system 336. While the VL camera module may include a video camera in some embodiments, this is not required, and its output may only include still photographs or images.

The IR camera module 334 may generally include an analog engine that interfaces with and controls an infrared sensor that captures an IR image of the scene and generates and streams raw IR image data (e.g. 30 Hz) to the processing sub-system 336. Just as with the VL camera module, the infrared sensor may include still image capture or video-rate capture. In one embodiment, within the sub-system 336, the IR image data is directed to a digital signal processor (DSP) 340 that performs computations to convert the raw IR image data to scene temperatures, and then to, e.g., RGB colors corresponding to the scene temperatures and a selected color palette. For example, U.S. Pat. No. 6,444,983 entitled "Microbolometer Focal Plane Array With Controlled Bias," incorporated herein in its entirety, discloses such an infrared camera.

The DSP 340 streams the resulting IR image data combined with color data (e.g., RGB form) to an FPGA 342 where it may optionally be combined with the VL image data. In another embodiment, the DSP 340 may provide the IR image data directly to the FPGA 342 without converting it to scene temperatures and/or colors. The FPGA 342 then combines the IR image data and the VL image data to a desired degree and sends the combined image data to the display 338.

Combining the IR image data with the VL image data can advantageously provide a set of images that allows an operator to view the same scene in multiple ways. For example, in some cases an image set is provided that includes one or more IR and VL images captured substantially simultaneously by the camera 200. In another example, IR and VL images may be combined into a composite image to allow an operator to simultaneously view a scene in both the IR and VL spectrums. According to certain embodiments, the composite images may include combined IR and VL image data, which allows a user to blend the IR and VL images together at any ratio from 100% visible to 100% infrared.

Among other components, the processing sub-system 336 includes a general-purpose microprocessor 344 that provides a graphical user interface (GUI) to the camera operator. This GUI interface consists of menus, text, and graphical display elements that are sent to the FPGA 342, where they are buffered in memory 348 and then sent to the display 338. A microcontroller 350 interfaces with the user interface 346 including camera buttons, mouse, LCD backlight, and a power supply 352 (e.g., a smart battery). It reads these inputs and provides the information to the processor 344 where it is used to control the GUI and provides other system control functions.

The FPGA 342 drives the display(s) 338 (LCD and/or TV, for example) with combined VL image data, infrared image data, and/or GUI data. The FPGA 342 requests both the VL and IR image data from the VL and IR camera modules and in some embodiments alpha-blends them together. It may also alpha-blend the resulting display image with the GUI data to create a final blended or composite image that is sent to the display 338. Of course the display 338 associated with the embodiments of the invention is not limited to an LCD-type display. The FPGA 342 operates under control of the DSP 340, which is further controlled by the processor 344. Additional memory 354 may be programmed with instructions for controlling the DSP 340, the FPGA 342 and/or the general processor 344. In some cases the processing sub-system 336 may output an alarm signal to an alarm module 356 to alert a camera user in the event that certain temperature events have occurred.

In some embodiments, the processing sub-system 336 may coordinate image processing and display of images on the camera 200 itself. In some embodiments, the processing sub-system 336 may additionally or alternatively transfer VL and IR image data to an external computing system, such as a personal computer coupled to the camera 200 with a data transfer cord, wireless protocol, memory card, and the like. The external computing system will generally include a general purpose microprocessor can also include memory programmed with software instructions for comparing and/or displaying the VL and IR image data as VL and IR images on the personal computer's display.

Figure 4A:
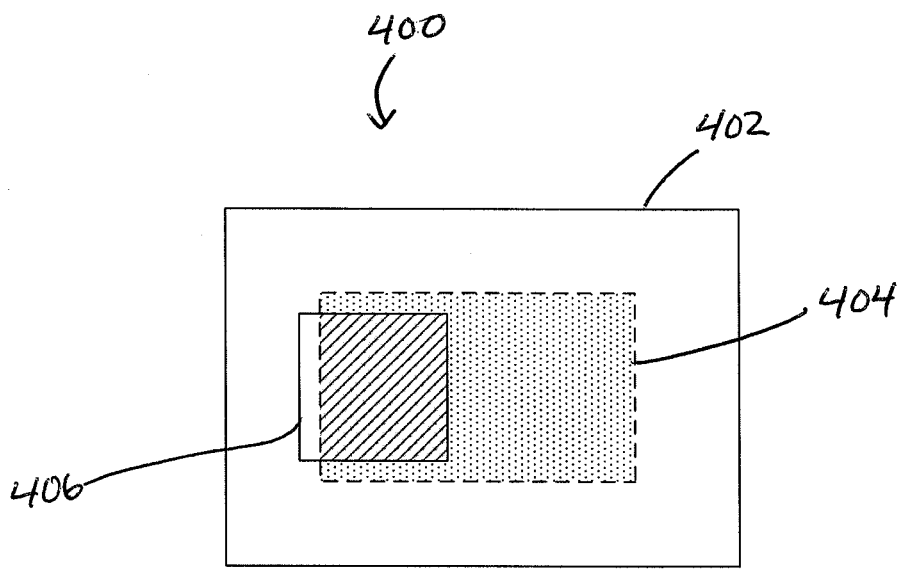
FIGS. 4A-4B illustrate first and second image data sets representative of a scene according to an embodiment of the invention.

Turning to FIGS. 4A-4H, a number of views of VL and IR images are shown illustrating an example of comparing IR image data according to some embodiments of the invention. FIG. 4A shows a first image data set 400 including first VL image data 402 and first IR image data 404 representative of a scene (not separately indicated) including an object 406. It should be appreciated that while FIGS. 4A-4H illustrate various images of the scene for ease of understanding some principles of the invention, discussion of the figures is in terms of image data, which is representative of the scene and can be used to generate the images shown. Some embodiments of the invention capture, correlate, compare and otherwise manipulate and use VL and IR image data without the need for displaying corresponding images generated from the image data. For example, in some embodiments VL and IR image data is processed to generate IR comparison image data, which may then be displayed to a user without displaying images of the VL and IR image data alone. In some embodiments, however, VL and IR image data from various preliminary and intermediate steps and processing may also be displayed as desired.

Figure 4B:
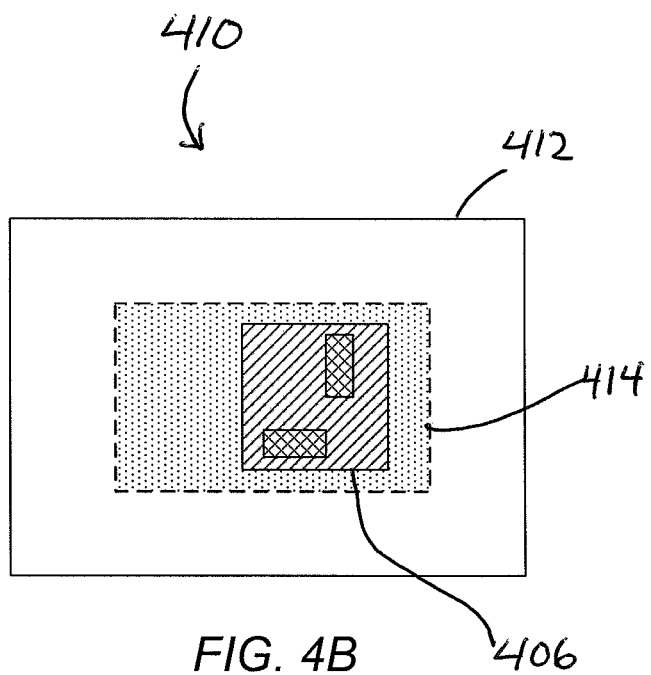

FIG. 4B illustrates a second image data set 410 including second VL image data 412 and second IR image data 414 representative of the scene including the object 406. As can be seen from a comparison of FIGS. 4A and 4B, the first image data set 400 and the second image data set 410 are representative of substantially the same scene, but are captured from differing points of view. Thus, while the object 406 remains stationary with respect to the scene, the object 406 also appears at different locations within the image data due to the different points of view. According to some embodiments, the first VL image data 402 is captured from a first VL point of view, the first IR image data 404 is captured from a first IR point of view, the second VL image data 412 is captured from a second VL point of view, and the second IR image data 414 is captured from a second IR point of view. Some of the points of view may be identical or different depending upon the particular embodiment of the invention.

Figure 4C:
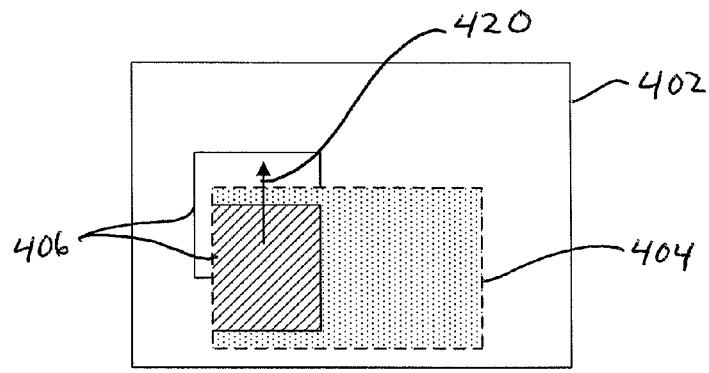
FIG. 4C illustrates a known correlation between IR image data and VL image data according to an embodiment of the invention.

Turning to FIG. 4C, in some embodiments the first VL point of view and the first IR point of view are related by a first known correlation 420. Although not shown, in some cases the second VL point of view may also be related to the second IR point of view by a second known correlation. Returning to FIG. 4C, in some cases the first known correlation represents a correction for a parallax error between the first VL and the first IR image data 402, 404. For example, such a parallax error can be introduced when capturing VL and IR image data with the camera of FIGS. 2A and 2B, in which the VL lens 204 is mounted above the IR lens 206. Thus, in some instances the first known correlation may be a fixed correlation. The invention is not limited to being implemented with a single thermal/visual imaging camera, however, and the first known correlation 420 in a broad sense is merely a known relationship between the first VL and IR points of view, regardless of whether image data is captured with a single camera or multiple cameras at one or more points in time.

Figure 4D:
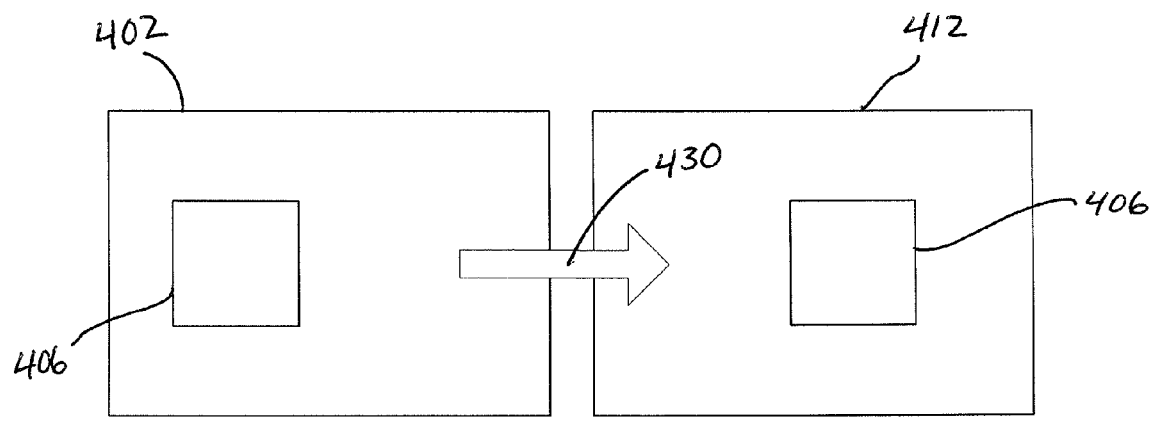
FIGS. 4D-4E illustrate comparing VL image data according to an embodiment of the invention.
Figure 4E:
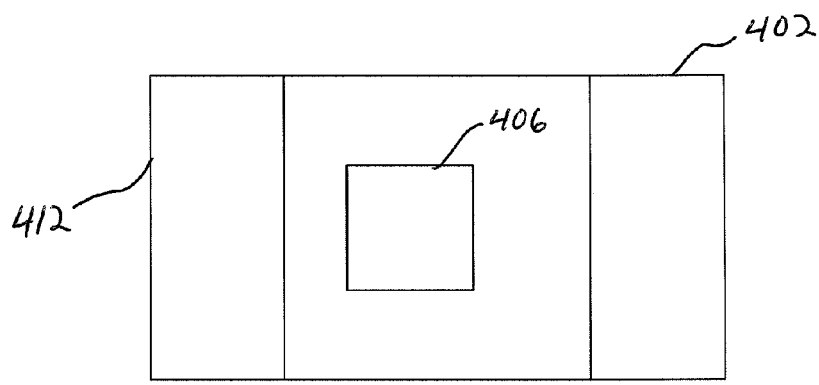

FIG. 4D is a schematic representation of a comparison of the first VL image data 402 and the second VL image data 412. According to some embodiments of the invention, the first VL image data 402 can be compared to the second VL image data 412 to determine an alignment correlation 430 that relates the first VL point of view to the second VL point of view. The alignment correlation 430 can then be used, for example, to align or register images corresponding to the first and the second VL image data 402, 412. FIG. 4E illustrates how pixels in the first and second VL image data 402, 412 can be correlated to align corresponding VL images. The alignment correlation 430 can also allow the direct comparison of correlated VL image data without generating corresponding images.

A number of different image data processing algorithms can be used to compare the first and the second VL image data in order to determine the alignment correlation 430. In some embodiments an area-based or feature-based registration method may be used to correlate the image data. For example, a Prewitt operator, a Sobel operator or a Roberts operator may be implemented to detect edges in the image data in a feature-based registration method. Preferably, the implemented method or methods of determining the alignment correlation 430 account for multiple forms of misalignment between the first and the second VL image data. For example, in some embodiments the alignment correlation 430 can provide a map between corresponding scene pixels that accounts for, e.g., horizontal and/or vertical translation, rotation, zoom, and other differences between the first and the second VL points of view. In some embodiments function calls from the programming language Matlab® or the Image Processing Toolbox provided by Mathworks can provide the desired alignment correlation 430. Once the alignment correlation 430 is determined, it can be stored in memory to be used at a later time. It should be appreciated that those skilled in the art are familiar with a number of such image processing methods for aligning or registering image data and the invention is not limited to any one method.

Figure 4F:
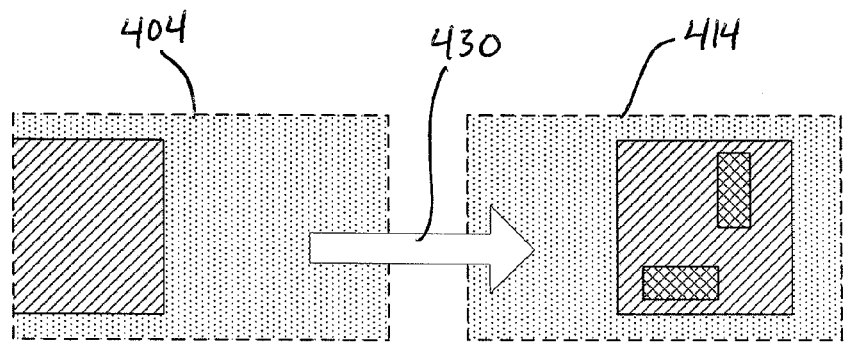
FIGS. 4F-4G illustrate correlating first and second IR image data with an alignment correlation according to an embodiment of the invention.
Figure 4G:
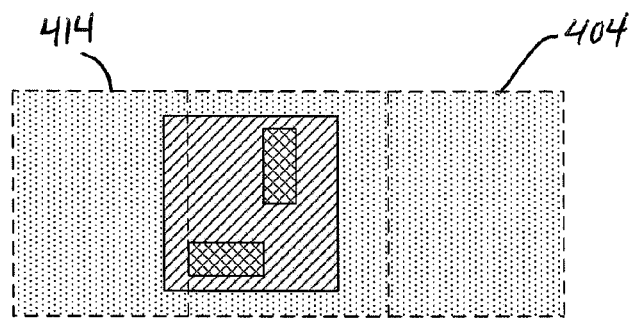

FIG. 4F illustrates correlating the first IR image data 404 with the second IR image data 414 using the alignment correlation 430 according to some embodiments. FIG. 4G illustrates the first and the second IR image data with the scene pixels aligned according to the alignment correlation 430. Thus, a misalignment of the first and the second IR image data (and corresponding images) can be addressed without necessarily determining a direct alignment relationship or spatial correlation between the first and the second IR image data and images. It can sometimes be difficult to directly characterize a misalignment between IR images and image data. Correlating the first and the second IR image data (e.g., resulting in aligned or registered corresponding IR images) based on the alignment correlation of the first and the second VL image data advantageously avoids the limitations of these types of effects.

Figure 4H:
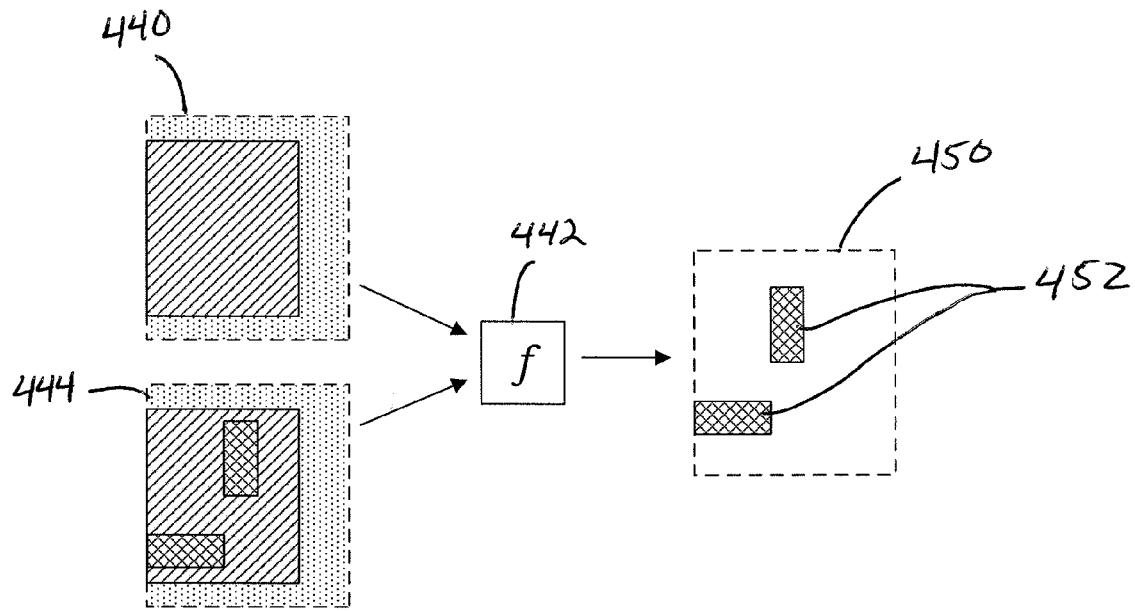
FIG. 4H illustrates comparing portions of IR image data to generate IR comparison image data according to an embodiment of the invention.

Turning to FIG. 4H, a schematic flow diagram illustrating a comparison of IR image data is depicted. In some embodiments, at least a portion 440 of the first IR image data 404 is compared 442 to a correlated portion 444 of the second IR image data 414. In some instances the compared portions 440, 444 of the first and the second IR image data may represent entire parts of the image data that "overlap", i.e., have corresponding pixels in the other IR image data, such as is illustrated in FIGS. 4G and 4H. In some cases, though, a smaller subset of the "overlapping" regions may be compared.

The comparison 442 of the portions 440, 444 of the IR image data can comprise a variety of functions depending upon the desired output. In some embodiments, the comparison 442 comprises a subtraction of the portion 444 of the second IR image data from the portion 440 of the first IR image data. In some embodiments, the comparison 442 includes comparing temperature gradients within the first and the second portions 440, 444. Upon comparing the portions 440, 444 of the IR image data, IR comparison image data 450 can be generated from the comparison. As illustrated in FIG. 4H, the IR comparison image data 450 is the result of a subtraction comparison. Areas 452 of temperature difference between the portions 440, 444 of the IR image data can be seen, while areas of the portions of the IR image data with the same temperatures are removed. Thus, an operator can easily determine changes in the temperature profile of the scene over a period of time.

Figure 5A:
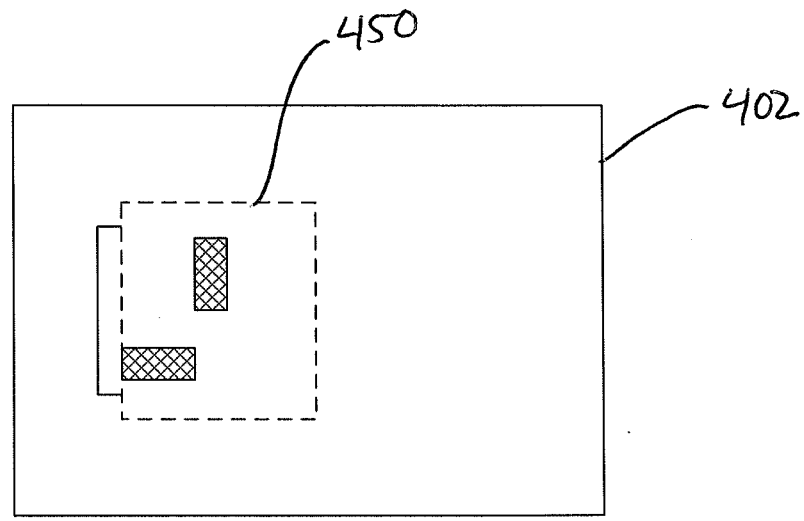
FIG. 5A illustrates a display of IR comparison image data combined with VL image data according to an embodiment of the invention.
Figure 5B:
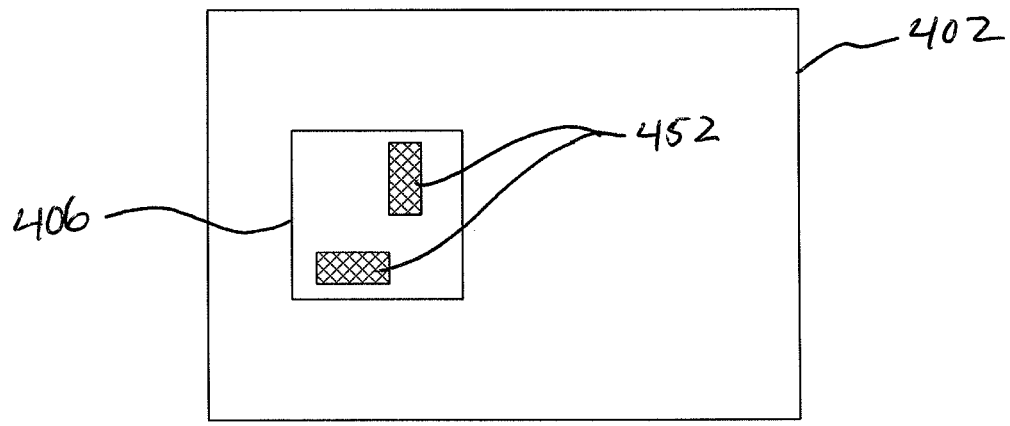
FIG. 5B illustrates a display of IR comparison image data combined with VL image data according to an embodiment of the invention.

The IR comparison image data 450 can be displayed in a number of manners if desired. For example, turning to FIG. 5A, in some embodiments, the entire IR comparison image data 450 may be overlaid or combined with the first VL image data 402 or the second VL image data 412. In some embodiments a thresholding or filtering function may be used to further process the IR comparison image data. For example, a threshold may be applied to the IR comparison image data such that pixels exhibiting less than a predefined amount of temperature change are filtered out and not displayed. This can allow the most prominent areas of temperature change to stand out, making it easier for technicians to identify and remedy problem areas in preventative maintenance. In addition, in some embodiments an alarm may indicate when the temperature change exceeds a predetermined level. As shown in FIG. 5B, the thresholded data (in this case the entire areas 452 of different temperature) may be displayed in combination with VL image data to allow an operator to more easily identify trouble areas.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A method for comparing infrared (IR) image data representative of a scene, comprising:
    selecting a first image data set of a scene, the first image data set comprising first visual-light (VL) image data captured from a first VL point of view and first IR image data captured from a first IR point of view, the first VL point of view having a first known correlation to the first IR point of view;
    selecting a second image data set of the scene, the second image data set comprising second VL image data captured from a second VL point of view and second IR image data captured from a second IR point of view, the second VL point of view having a second known correlation to the second IR point of view;
    comparing the first VL image data to the second VL image data to determine an alignment correlation between the first VL point of view and the second VL point of view;
    correlating the second IR image data with the first IR image data using the first and the second known correlations and the alignment correlation; and
    comparing at least a portion of the first IR image data to a correlated portion of the second IR image data to generate IR comparison image data.

2. The method of claim 1, further comprising combining the IR comparison image data with the first VL image data or the second VL image data to produce a VL and IR composite comparison image.

3. The method of claim 1, wherein comparing the portion of the first IR image data with the correlated portion of the second IR image data comprises subtracting the correlated portion of the second IR image data from the portion of the first IR image data.

4. The method of claim 1, further comprising correlating the IR comparison image data with temperature difference.

5. The method of claim 1, further comprising thresholding the IR comparison image data to identify a subset of the IR comparison image data exceeding a threshold temperature difference.

6. The method of claim 1, wherein the first known correlation is the same as the second known correlation.

7. The method of claim 1, wherein the first known correlation is fixed.

8. A non-transitory computer-readable storage medium having computer-executable instructions for performing a method for generating infrared (IR) comparison image data, the method comprising:
    selecting a first image data set of a scene, the first image data set comprising first visual-light (VL) image data captured from a first VL point of view and first IR image data captured from a first IR point of view, the first VL point of view having a first known correlation to the first IR point of view;
    selecting a second image data set of the scene, the second image data set comprising second VL image data captured from a second VL point of view and second IR image data captured from a second IR point of view, the second VL point of view having a second known correlation to the second IR point of view;
    comparing the first VL image data to the second VL image data to determine an alignment correlation between the first VL point of view and the second VL point of view;
    correlating the second IR image data with the first IR image data using the first and the second known correlations and the alignment correlation; and
    comparing at least a portion of the first IR image data to a correlated portion of the second IR image data to generate IR comparison image data.

9. The non-transitory computer-readable storage medium of claim 8, wherein comparing the portion of the first IR image data with the correlated portion of the second IR image data comprises subtracting the correlated portion of the second IR image data from the portion of the first IR image data.

10. An infrared (IR) imaging camera, comprising:
    a visible-light (VL) camera module having a VL sensor for capturing VL image data from a scene;
    an IR camera module having an IR sensor for capturing IR image data from the scene, the IR camera module having a known spatial correlation to the VL camera module;
    a display for displaying at least a portion of the VL image data and/or at least a portion of the IR image data; and
    a programmable processor coupled with the display and the IR and the VL camera modules, the processor programmed with instructions for
    (a) selecting a first image data set of the scene, the first image data set comprising first VL image data captured by the VL camera module from a first VL point of view and first IR image data captured by the IR camera module from a first IR point of view, the first VL and the first IR points of view related by the known spatial correlation, (b) selecting a second image data set of the scene, the second image data set comprising second VL image data captured by the VL camera module from a second VL point of view and second IR image data captured by the IR camera module from a second IR point of view, the second VL and the second IR points of view related by the known spatial correlation, and (c) generating IR comparison image data from the first and the second IR image data, comprising (1) comparing the first VL image data to the second VL image data to determine an alignment correlation between the first VL point of view and the second VL point of view, (2) correlating the second IR image data with the first IR image data using the known spatial correlation and the alignment correlation, and (3) comparing at least a portion of the first IR image data to a correlated portion of the second IR image data to generate the IR comparison image data.

11. The method of claim 10, wherein comparing the portion of the first IR image data with the correlated portion of the second IR image data comprises subtracting the correlated portion of the second IR image data from the portion of the first IR image data.

12. The method of claim 10, further comprising correlating the IR comparison image data with temperature difference.

13. The method of claim 10, further comprising thresholding the IR comparison image data to identify a subset of the IR comparison image data exceeding a threshold temperature difference.

14. A method of tracking localized temperature changes within a scene, comprising:

capturing at a first instant first visual-light (VL) image data of a scene and first infrared (IR) image data of the scene, the first IR image data being indicative of localized temperatures within the scene at the first instant;

capturing at a second instant second VL image data of the scene and second IR image data of the scene, the second IR image data being indicative of the localized temperatures within the scene at the second instant;

determining an alignment correlation between the first and the second VL image data;

correlating the second IR image data with the first IR image data using the alignment correlation;

comparing at least a portion of the first IR image data to a correlated portion of the second IR image data to generate IR comparison image data indicative of differences between the localized temperatures within the scene at the first instant and the second instant; and displaying at least a portion of the IR comparison image data.

15. The method of claim 14, wherein comparing the portion of the first IR image data with the correlated portion of the second IR image data comprises subtracting the correlated portion of the second IR image data from the portion of the first IR image data.

16. The method of claim 14, further comprising thresholding the IR comparison image data to identify a subset of the IR comparison image data exceeding a threshold temperature difference.

17. The method of claim 16, wherein displaying the at least a portion of the IR comparison image data comprises displaying only the subset of the IR comparison image data exceeding the threshold temperature difference.

18. The method of claim 14, further comprising combining the IR comparison image data with the first VL image data or the second VL image data to produce a VL and IR composite comparison image.

* * * * *